United States Patent
Tasaki et al.

(10) Patent No.: US 10,275,900 B2
(45) Date of Patent: Apr. 30, 2019

(54) ESTIMATION APPARATUS, ESTIMATION METHOD, AND COMPUTER PROGRAM PRODUCT

(71) Applicant: KABUSHIKI KAISHA TOSHIBA, Tokyo (JP)

(72) Inventors: Tsuyoshi Tasaki, Kanagawa (JP); Yuto Yamaji, Kanagawa (JP); Manabu Nishiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 15/260,598

(22) Filed: Sep. 9, 2016

(65) Prior Publication Data

US 2017/0270682 A1 Sep. 21, 2017

(30) Foreign Application Priority Data

Mar. 17, 2016 (JP) ................................ 2016-054473

(51) Int. Cl.
*G06K 9/00* (2006.01)
*G06T 7/60* (2017.01)
(Continued)

(52) U.S. Cl.
CPC .............. *G06T 7/60* (2013.01); *G01S 7/4802* (2013.01); *G01S 17/89* (2013.01); *G01S 17/936* (2013.01); *G06K 9/00805* (2013.01); *G06K 9/4604* (2013.01); *G06K 9/6211* (2013.01); *G06N 7/005* (2013.01); *G06N 99/005* (2013.01); *G06T 7/73* (2017.01)

(58) Field of Classification Search
None
See application file for complete search history.

(56) References Cited

U.S. PATENT DOCUMENTS 4,982,379 A * 1/1991 Miyata .............. G06F 17/30982
                                                    365/189.05
5,008,816 A * 4/1991 Fogg, Jr. ............. G06F 12/0284
                                                    711/168
(Continued)

FOREIGN PATENT DOCUMENTS

JP          4918807       10/2007
JP       2009-223797      10/2009
(Continued)

*Primary Examiner* — Nancy Bitar
(74) *Attorney, Agent, or Firm* — Finnegan, Henderson, Farabow, Garrett & Dunner, L.L.P.

(57) ABSTRACT

According to an embodiment, an estimation apparatus includes a memory and a processor. The processor acquires a first measurement point groups obtained by measuring a periphery of a first moving object. The processor estimates a position and posture of the first moving object. The processor classifies first measurement points serving as candidates of measurement points on a second moving object in the newest first measurement point group as candidate points. The processor acquires second moving object information from the second moving object. The processor calculates an evaluation value using a first likelihood defined according to a position relationship between an orientation of a region specified from the second moving object information and the candidate points. The processor estimates a position and posture of the second moving object based on the evaluation value.

15 Claims, 10 Drawing Sheets

(51) Int. Cl.
  *G06N 7/00*    (2006.01)
  *G06N 99/00*   (2019.01)
  *G01S 17/89*   (2006.01)
  *G01S 17/93*   (2006.01)
  *G01S 7/48*    (2006.01)
  *G06K 9/46*    (2006.01)
  *G06K 9/62*    (2006.01)
  *G06T 7/73*    (2017.01)

(56) References Cited

U.S. PATENT DOCUMENTS

| | | | |
|---|---|---|---|
| 5,751,743 A * | 5/1998 | Takizawa | H04L 1/0041 |
| | | | 714/774 |
| 8,180,561 B2 | 5/2012 | Osanai | |
| 9,086,481 B1 * | 7/2015 | Dowdall | G01S 17/58 |
| 2012/0323444 A1 * | 12/2012 | Rieger | B60W 40/11 |
| | | | 701/37 |
| 2013/0235201 A1 * | 9/2013 | Kiyohara | G06K 9/00805 |
| | | | 348/148 |
| 2014/0219502 A1 * | 8/2014 | Hirota | G01B 11/002 |
| | | | 382/103 |
| 2014/0324312 A1 | 10/2014 | Okuya et al. | |
| 2015/0347840 A1 | 12/2015 | Iida | |

FOREIGN PATENT DOCUMENTS

| | | |
|---|---|---|
| JP | 2009-255600 | 11/2009 |
| JP | 4918807 | 4/2012 |
| JP | 2014-215678 | 11/2014 |

* cited by examiner

ESTIMATION APPARATUS, ESTIMATION METHOD, AND COMPUTER PROGRAM PRODUCT

CROSS-REFERENCE TO RELATED APPLICATIONS

This application is based upon and claims the benefit of priority from Japanese Patent Application No. 2016-054473, filed on Mar. 17, 2016; the entire contents of which are incorporated herein by reference.

FIELD

Embodiments described herein relate generally to an estimation apparatus, an estimation method, and a computer program product.

BACKGROUND

In the related art, there is known a technique of estimating a position and posture of a second moving object (for example, other vehicle) existing in a periphery of a first moving object (for example, own vehicle). For example, there is known a technique of estimating the position and posture of the other vehicle by three-dimensionally measuring the periphery of the own vehicle and by using a degree of coincidence between a moving vector of the other vehicle obtained from time-series association with measurement points obtained by the three-dimensional measurement and a moving vector of the other vehicle acquired from the other vehicle through inter-car communication.

DETAILED DESCRIPTION

According to an embodiment, an estimation apparatus includes a memory and a processor. The processor acquires a first measurement point groups obtained by measuring a periphery of a first moving object. The processor estimates a position and posture of the first moving object. The processor classifies, based on the position and posture and a past first measurement point group acquired before a newest first measurement point group, a plurality of first measurement points serving as candidates of measurement points on a second moving object other than the first moving object in the newest first measurement point group as a plurality of candidate points. The processor acquires second moving object information including a position of the second moving object and at least one side length of width and length of the second moving object from the second moving object. The processor calculates an evaluation value using a first likelihood defined according to a position relationship between an orientation of a region specified from the second moving object information and the plurality of candidate points. The processor estimates a position and posture of the second moving object based on the evaluation value.

Hereinafter, embodiments will be described in detail with reference to attached drawings.

Figure 1:
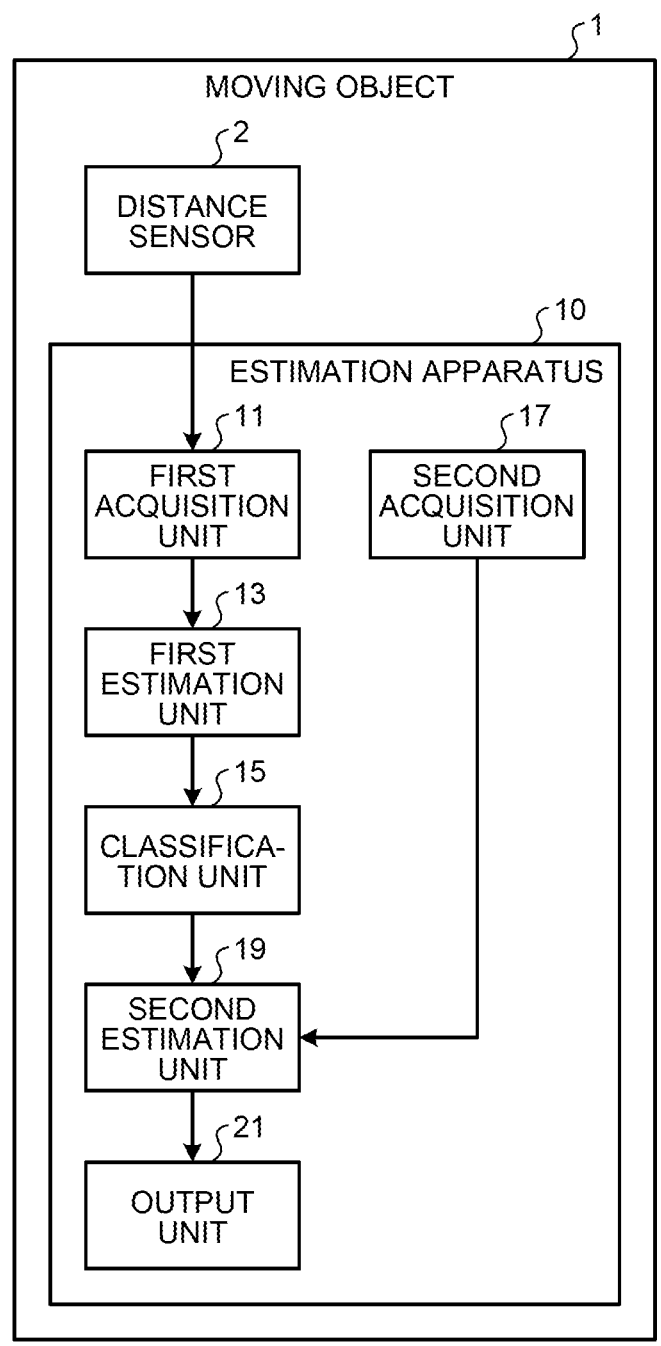
FIG. 1 is a diagram illustrating an example of a configuration of an estimation apparatus according to an embodiment.

FIG. 1 is a diagram illustrating an example of a configuration of an estimation apparatus 10 according to an embodiment. As illustrated in FIG. 1, the estimation apparatus 10 is mounted on a moving object 1 (an example of a first moving object) equipped with a distance sensor 2 and is configured to include a first acquisition unit 11, a first estimation unit 13, a classification unit 15, a second acquisition unit 17, a second estimation unit 19, and an output unit 21.

In the embodiment, a case where the moving object is a vehicle such as a car is described as an example. However, the embodiments are not limited thereto. For example, the moving object may be any movable object such as a ship or a mobile robot.

As the distance sensor 2, for example, at least one of a laser sensor and an image sensor (camera) may be exemplified. The distance sensor 2 outputs information obtained by sensing to the estimation apparatus 10.

The estimation apparatus 10 estimates a position and posture of a moving object (an example of a second moving object) other than a moving object 1, which exists in a periphery of the moving object 1. As the estimation apparatus, a computer may be exemplified. As the moving object 1, an own moving object (own vehicle) may be exemplified. As the moving object other than the moving object 1, another moving object (other vehicle) may be exemplified.

The first acquisition unit 11, the first estimation unit 13, the classification unit 15, the second acquisition unit 17, the second estimation unit 19, and the output unit 21 may be implemented by allowing a processing apparatus, for example, a CPU (Central Processing Unit) or the like to execute a program, namely, by software, may be implemented by hardware such as an IC (integrated Circuit), or may be implemented by combining software and hardware.

The first acquisition unit 11 periodically acquires a first measurement point group obtained by measuring the periphery of the moving object 1. More specifically, every time when sensing is performed by the distance sensor 2, the first acquisition unit 11 three-dimensionally measures the periphery of the moving object 1 based on information obtained by the sensing, so as to acquire the first measurement point group that is a set of measurement points three-dimensionally measured. In the embodiment, the first measurement point group represents obstacles existing in the periphery of the moving object 1. As obstacles, dynamic obstacles such as other moving objects and static obstacles such as structures may be exemplified.

The first acquisition unit 11 may perform three-dimensional measurement by using a known three-dimensional point measurement method.

For example, in a case where the distance sensor 2 is an image sensor, the distance sensor 2 sequentially captures images the periphery of the moving object 1 in time series and the first acquisition unit 11 detects feature points from a plurality of images captured in time series by the distance sensor 2 and three-dimensionally measures measurement points in a real space corresponding to the feature points on the images by tracking the detected feature points on the images in series, so as to acquire the first measurement point group.

In a case where the distance sensor 2 is a laser sensor, the distance sensor 2 irradiates the periphery of the moving object 1 with laser and senses a phase difference between irradiated light and reflected light of the laser or a reflection time taken for reflection, and the first acquisition unit 11 three-dimensionally measures the measurement points irradiated with the laser by using the phase difference or reflection time sensed by the laser sensor, so as to acquire the first measurement point group.

Figure 2:
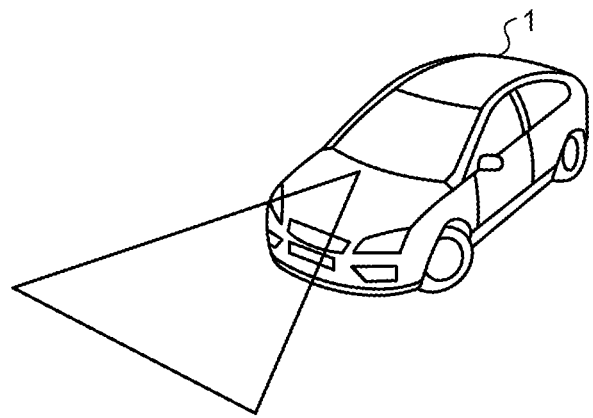
FIG. 2 is a diagram illustrating an example of an aspect of laser irradiation of a distance sensor according to the embodiment.
Figure 3:
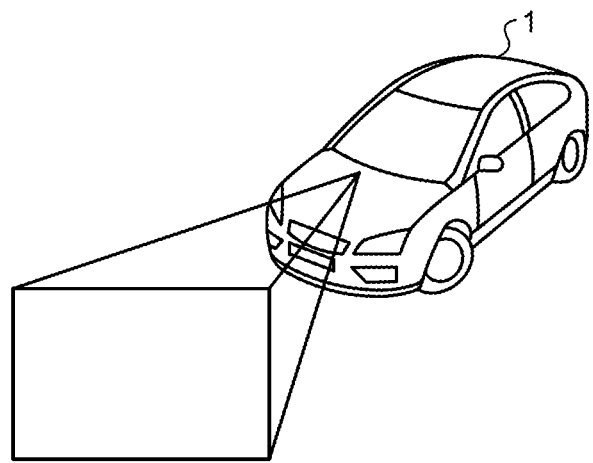
FIG. 3 is a diagram illustrating an example of an aspect of laser irradiation of the distance sensor according to the embodiment.

In a case where the distance sensor 2 is a laser sensor, as illustrated in FIG. 2, the distance sensor 2 may be a laser sensor which performs two-dimensional irradiation with laser (irradiation with laser at a fixed height); and as illustrated in FIG. 3, the distance sensor may be a laser sensor which performs three-dimensional irradiation with laser (irradiation with later at a non-fixed height)

In the case where the distance sensor 2 performs two-dimensional irradiation with laser, the first measurement point group is a set of the first measurement points in two dimensions (on a plane using the laser irradiation height as a reference). In the case where the distance sensor 2 performs three-dimensional irradiation with laser, the first measurement point group is a set of the first measurement points in three dimensions.

Figure 4:
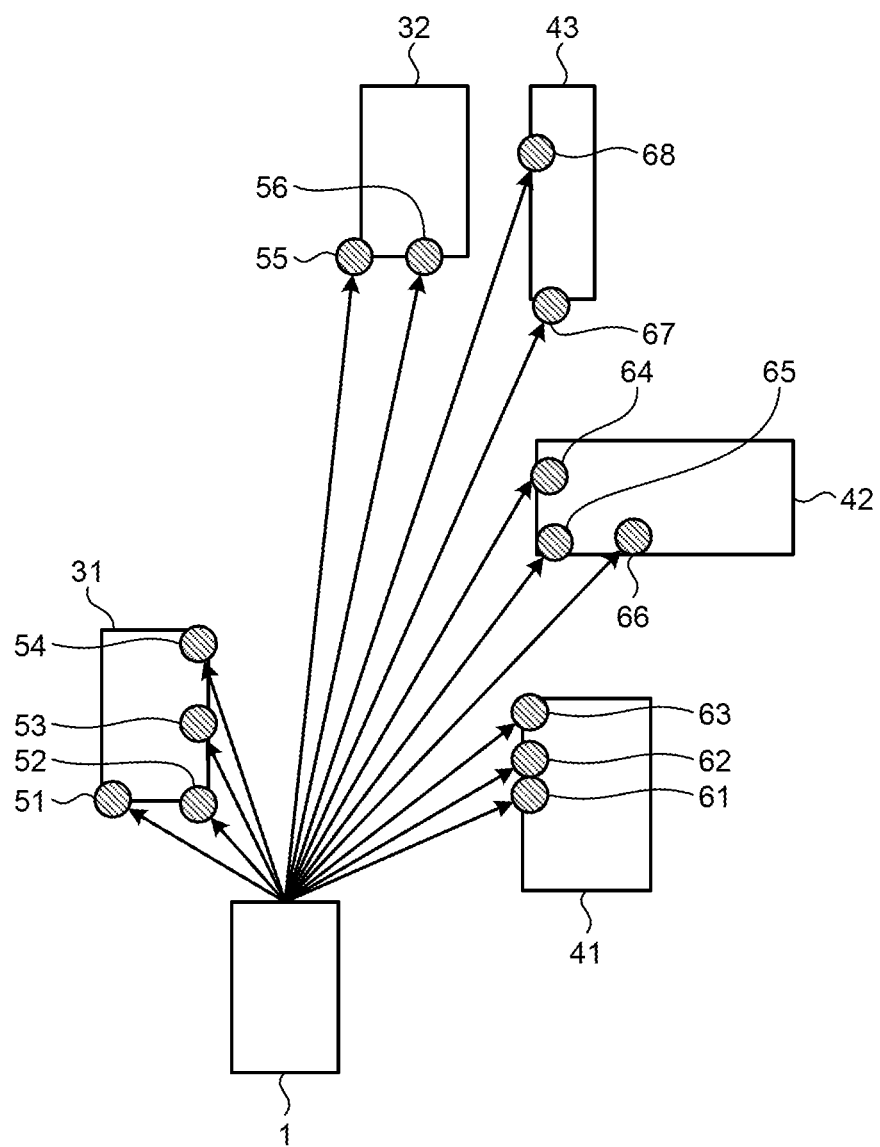
FIG. 4 is a diagram illustrating an example of a first measurement point group according to the embodiment.

Hereinafter, for the convenience of description, the case where the first measurement point group is a set of the first measurement points on a two-dimensional plane as illustrated in FIG. 4 will be described as an example. Even in the case where distance sensor 2 is an image sensor, if a set of the first measurement points at a specific height is defined as a first measurement point group, the first measurement point group as illustrated in FIG. 4 can be obtained.

In the example illustrated in FIG. 4, other moving objects 31 and 32 as dynamic obstacles and structures 41, 42, and 43 as static obstacles exist in the periphery of the moving object 1, and as the first measurement point group, measurement points 51 to 56 and measurement points 61 to 68 are obtained. In the step of acquiring the first measurement point group by the first acquisition unit 11, in the estimation apparatus 10, which of the obstacles each measurement point constituting the acquired first measurement point group represents is unknown.

The first estimation unit 13 estimates the position and posture of the moving object 1. The first estimation unit 13 may estimate the position and posture of the moving object 1 by using a known posture calculation method. For example, every time when sensing is performed by the distance sensor 2, the first estimation unit 13 estimates the position and posture of the moving object 1 based on the information obtained by the sensing.

For example, in a case where the distance sensor 2 is an image sensor, the first estimation unit 13 estimates a newest (current) position and posture of the moving object 1 viewed from a past position and posture of the moving object 1 by tracking, in time series, feature points on the image detected by the first acquisition unit 11, from each of the plurality of images captured in time series by the distance sensor 2. In addition, the first estimation unit 13 itself may be configured to detect the feature points from each of the plurality of images captured in time series by the distance sensor 2.

For example, in a case where the distance sensor 2 is a laser sensor, the first estimation unit 13 estimates the newest position and posture of the moving object 1 viewed from the past position and posture of the moving object 1 by associating, in time series, the first measurement points acquired by the first acquisition unit 11.

The first estimation unit 13 may be configured to directly estimate the newest position and posture of the moving object 1 by using information obtained by the sensing performed by a position sensor such as a global positioning system (GPS) or a posture sensor such as an inertial measurement unit (IMU) rather than the information obtained by the sensing performed by the distance sensor 2.

Based on the position and posture of the moving object 1 estimated by the first estimation unit 13 and the past first measurement point group acquired before the newest first measurement point group acquired by the first acquisition unit 11, the classification unit 15 classifies, as a plurality of candidate points, a plurality of first measurement points serving as candidates of the measurement points on the other moving object other than the moving object 1 in the newest first measurement point group. The classification unit 15 classifies, as static points, the first measurement points other than the plurality of first measurement points serving as the candidates of the measurement points on the other moving object in the newest first measurement point group.

More specifically, the classification unit 15 projects the newest first measurement point group and the past first measurement point group on the coordinate system viewed from the position and posture of the moving object 1 at the time of acquiring the newest first measurement point group. The classification unit 15 then extracts a pair of the newest first measurement point and the past first measurement point corresponding to each other from the newest first measurement point group and the past first measurement point group and determines whether or not the distance between the first measurement points is within a threshold distance for classification. If the distance is within the threshold distance for classification, the classification unit classifies the newest first measurement point as a static point. If the distance is not within the threshold distance for classification, the classification unit classifies the newest first measurement point as a candidate point.

Figure 5:
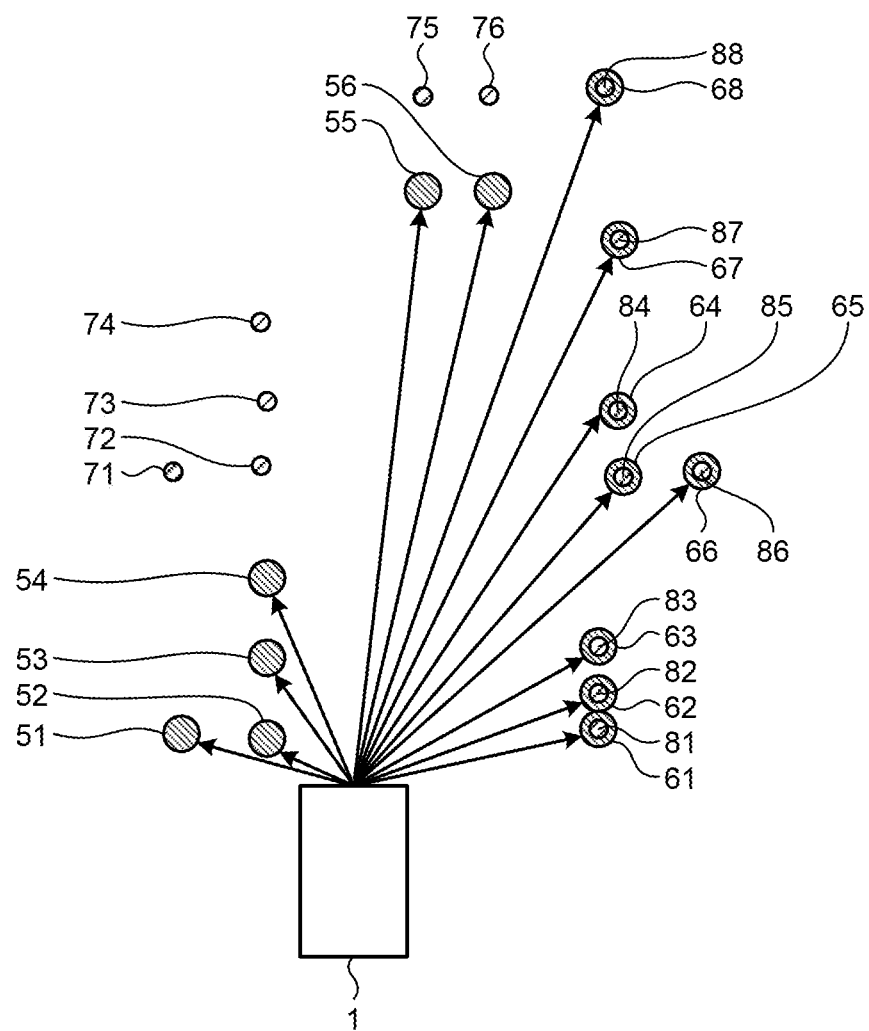
FIG. 5 is a diagram illustrating an example of a classification method according to the embodiment.

FIG. 5 is a diagram illustrating an example of a classification method according to the embodiment. In the example illustrated in FIG. 5, newest measurement points 51 to 56 and newest measurement points 61 to 68 constituting the newest first measurement point group and past measurement points 71 to 76 and past measurement points 81 to 88 constituting the past first measurement point group are projected on the coordinate system viewed from the position and posture of the moving object 1 at the time of acquiring the newest first measurement point group. It is assumed that the newest measurement points 51 to 56 and the newest measurement points 61 to 68 correspond to the past measurement points 71 to 76 and the past measurement points 81 to 88, respectively. In the calculation, a newest measurement point is associated with a past measurement point projected on the position nearest to the newest measurement point.

In this case, with respect to the newest measurement point 51, since the distance to the corresponding past measurement point 71 is not within the threshold distance for classification, the newest measurement point 51 is classified as a candidate point. Although description is omitted, similarly, the newest measurement points 52 to 56 are classified as candidate points. In addition, as illustrated in FIG. 4, since the measurement points 51 to 56 are measurement points representing the other moving objects 31 and 32 and are moved according to change in time series, the distances to the corresponding past measurement points are not within the threshold distance for classification.

On the other hand, with respect to the newest measurement point 61, since the distance to the corresponding past measurement point 81 is within the threshold distance for classification, the newest measurement point 61 is classified as a static point. Although description is omitted, similarly, the newest measurement points 62 to 68 are classified as static points. In addition, as illustrated in FIG. 4, since the measurement points 61 to 68 are measurement points representing the structures 41, 42, and 43 and are not moved according to change in time series, the distances to the corresponding past measurement points are within the threshold distance for classification.

The second acquisition unit 17 acquires, from the other moving object other than the moving object 1, second moving object information including the position of the other moving object and at least one side length of a car width and a car length of the other moving object. However, the information included in the second moving object information is not limited thereto, but posture or the like of the other moving object may be included. In the embodiment, the case where the information included in the second moving object information is the position of the other moving object and the car width of the other moving object will be described as an example.

Specifically, the second acquisition unit 17 performs wireless communication with other moving object which is located within a predetermined range from the moving object 1 through inter-car communication or the like to acquire the second moving object information from the other moving object. In the first embodiment, it is assumed that the predetermined range is a range of a distance obtained in a monotonically increasing function using a current braking distance of the moving object 1 as an input. For example, in a case where where the braking distance is k [m], the predetermined range may be within a range of ak+b [m] by using constants a and b. Namely, in the first embodiment, the predetermined range is widened as the braking distance of the moving object 1 is increased. Upper and lower limits of the monotonically increasing function may be set. In the case where the distance obtained by the monotonically increasing function is higher than the upper limit, the distance may be rounded off to the upper limit value; while in a case where the distance is lower than the lower limit, the distance may be rounded off to the lower limit value. However, the predetermined range is not limited thereto, but a pre-defined range may be used.

The second estimation unit 19 calculates an evaluation value by using a first likelihood defined according to a position relationship between an orientation of a region specified from the second moving object information acquired by the second acquisition unit 17 and a plurality of candidate points classified by the classification unit 15 and estimates position and posture of the other moving object based on the evaluation value. More specifically, the second estimation unit 19 estimates the region in the orientation where the evaluation value becomes highest as the position and posture of the other moving object.

For example, the second estimation unit 19 sets a plurality of position/posture candidates of other moving object, which are a plurality of regions where the car width is fixed as the car width of the other moving object included in the second moving object information and the car length and orientation are variously changed within a threshold range for region setting at the position of the other moving object included in the second moving object information acquired by the second acquisition unit 17. The second estimation unit 19 then calculates, for each set position/posture candidate, the first likelihood defined according to the position relationship between the position/posture candidate and the h plurality of candidate points classified by the classification unit 15.

Figure 6:
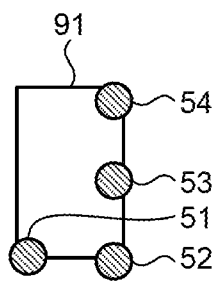
FIG. 6 is a diagram illustrating an example of calculation of a first likelihood according to the embodiment.
Figure 7:
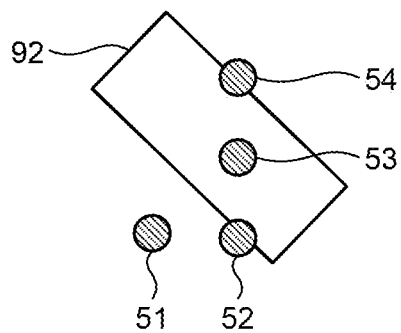
FIG. 7 is a diagram illustrating an example of calculation of a first likelihood according to the embodiment.

As the first likelihood, there is likelihood (contour likelihood) whose value is increased as the number of candidate points included within the first threshold distance from the contour of the region (position/posture candidate) is increased. For example, it is assumed that the measurement points 51 to 54 serving as the candidate points are included within the threshold range for region setting of the other moving object. In this case, the measurement points 51 to 54 exist on the contour of a position/posture candidate 91 illustrated in FIG. 6, and the number of candidate points included within the first threshold distance from the contour is four. On the other hand, the measurement points 52 and 54 exist on the contour of a position/posture candidate 92 illustrated in FIG. 7, and the number of candidate points included within the first threshold distance from the contour is two. For this reason, in case of comparing the position/posture candidate 91 and the position/posture candidate 92, the first likelihood of the position/posture candidate 91 is higher than that of the position/posture candidate 92. In the case where the first likelihood is directly set as an evaluation value, the position/posture candidate 91 is estimated as the position and posture of the other vehicle.

Figure 8:
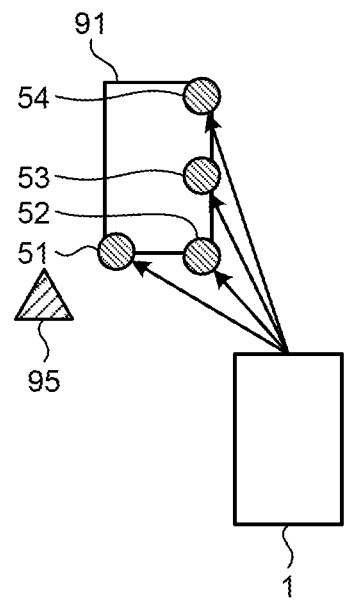
FIG. 8 is a diagram illustrating an example of calculation of a first likelihood according to the embodiment.
Figure 9:
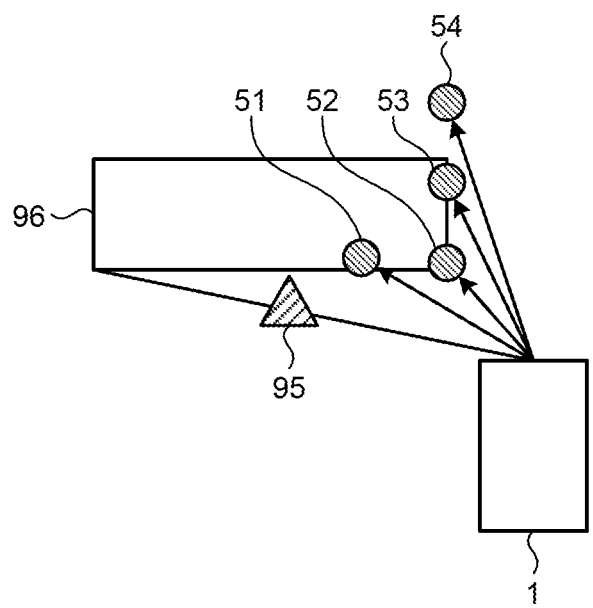
FIG. 9 is a diagram illustrating an example of calculation of a first likelihood according to the embodiment.

As the first likelihood, there is likelihood (shielding likelihood) whose value is increased as the number of static points located between the moving object 1 (more specifically, the distance sensor 2) and the region (position/posture candidate) is decreased. For example, the measurement points 51 to 54 serving as the candidate points and the measurement point 95 serving as the static point are included within the threshold range for region setting of the other moving object. In this case, as illustrated in FIG. 8, the static point is not included between the moving object 1 and the position/posture candidate 91 (more specifically, the contour of the position/posture candidate 91), and thus, the number of static points located between the moving object 1 and the position/posture candidate 91 is zero. On the other hand, as illustrated in FIG. 9, the static point 95 is included between the moving object 1 and the position/posture candidate 96 (more specifically, the contour of the position/posture candidate 96), and thus, the number of static points located between the moving object 1 and the position/posture candidate 96 is one. For this reason, in case of comparing the position/posture candidate 91 and the position/posture candidate 96, in a case where the first likelihood of the position/posture candidate 91 is higher than that of the position/posture candidate 96 and the first likelihood is directly set as the evaluation value, the position/posture candidate 91 is estimated as position and posture of the other vehicle. As a specific value of the shielding likelihood, a value obtained by subtracting the number of static points located between the moving object 1 and the position/posture candidate from the number of candidate points may be used.

As described above, the first likelihood may be directly set as the evaluation value, and an integrated value of a plurality of first likelihoods (for example, contour likelihoods and shielding likelihoods) may be set as the evaluation value. In this case, the second estimation unit 19 normalizes each first likelihood and sets the evaluation value by performing sum/product calculation. The sum/product calculation may be only summation of the normalized likelihoods or may be only multiplication of the normalized likelihoods.

In a case where the car length not the car width of the other moving object is included in the second moving object information, the second estimation unit 19 may set a plurality of position/posture candidates of the other moving object, which are a plurality of regions where the car length is fixed to the car length of the other moving object included in the second moving object information and the car width and orientation are variously changed.

In a case where the car length as well as the car width of the other moving object is included in the second moving object information, the second estimation unit 19 may set a plurality of position/posture candidates of the other moving object, which are a plurality of regions where the car width is fixed to the car width of the other moving object included in the second moving object information, the car length is fixed to the car length of the other moving object included in the second moving object information, and the orientation is variously changed.

In a case where the posture of the other moving object is included in the second moving object information, the second estimation unit 19 may set a plurality of position/posture candidates of the other moving object, which are a plurality of regions by changing the orientation within the threshold range for directing the posture included in the second moving object information.

The output unit 21 outputs the position and posture of the other moving object estimated by the second estimation unit 19. For example, the output unit 21 may output the position and posture of the other moving object estimated by the second estimation unit 19 to a control system of the moving object 1 so that the position and posture may be used for various control of the moving object 1.

Figure 10:
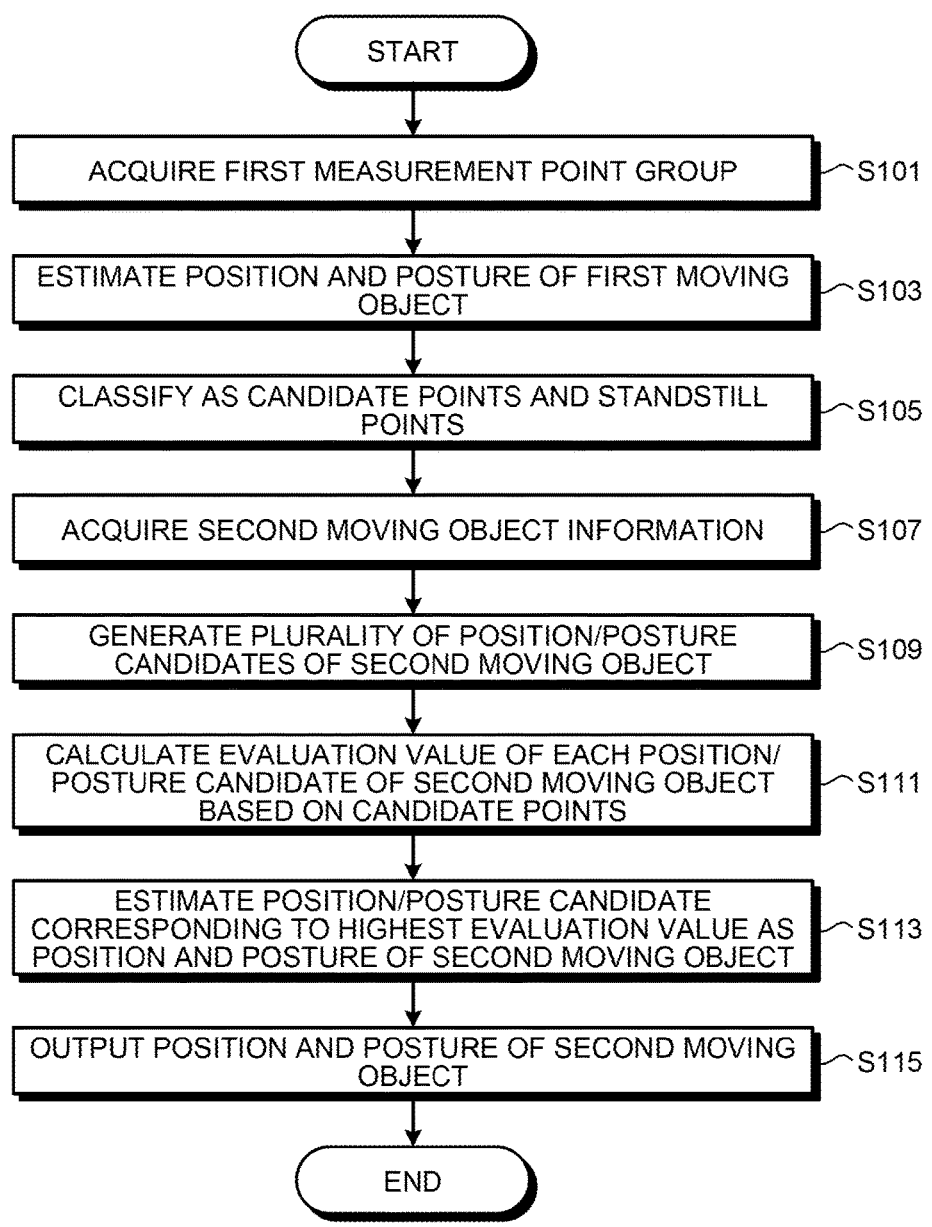
FIG. 10 is a flowchart illustrating an example of a process according to an embodiment.

FIG. 10 is a flowchart illustrating an example of a process procedure according to the embodiment. In addition, the process illustrated in FIG. 10 is periodically performed.

First, the first acquisition unit 11 acquires the first measurement point group obtained by measuring the periphery of the moving object 1 (first moving object) (Step S101).

Next, the first estimation unit 13 estimates the position and posture of the moving object 1 (first moving object) (Step S103).

Subsequently, based on the position and posture of the moving object 1 (first moving object) estimated by the first estimation unit 13 and the past first measurement point group acquired before the newest first measurement point group acquired by the first acquisition unit 11, the classification unit 15 classifies, as candidate points, a plurality of first measurement points serving as candidates of the measurement points on the other moving object (second moving object) in the newest first measurement point group; and classifies, as static points, a plurality of first measurement points other than a plurality of first measurement points serving as the candidates (Step S105).

Next, the second acquisition unit 17 acquires the second moving object information including the position of the other moving object and at least one side length of the car width and the car length of the other moving object from the other moving object (second moving object) (Step S107).

Subsequently, the second estimation unit 19 sets a plurality of position/posture candidates of the other moving object, which are a plurality of regions where the car width is fixed to the car width of the other moving object included in the second moving object information and the car length and orientation are variously changed within the threshold range for region setting from the position of the other moving object (second moving object) included in the second moving object information acquired by the second acquisition unit 17 (Step S109).

Next, the second estimation unit 19 calculates the evaluation value of each position/posture candidate by calculating the first likelihood of each position/posture candidate of the other moving object (second moving object) based on a plurality of candidate points classified by the classification unit 15 (Step S111).

Subsequently, the second estimation unit 19 estimates the position/posture candidate which has the highest evaluation value as the position and posture of the other moving object (Step S113).

Next, the output unit 21 outputs the position and posture of the other moving object estimated by the second estimation unit 19 (Step S115).

According to the embodiment described above, even in a case where the density of the measurement points representing other moving object is small as the distance of the other moving object existing in the periphery of the moving object 1 is increased (for example, the other moving object is separated by 50 m or more), it is possible to improve accuracy of estimation of the position and posture of the other moving object.

Modified Example 1

In the above-described embodiment, the measurement points acquired from the other moving objects may be further used. Modified Example 1 will be described with reference to FIG. 11.

In this case, the second acquisition unit 17 further acquires a second measurement point group from another moving object 31 (an example of a third moving object) obtained by measuring a periphery of the third moving object.

The first estimation unit 13 estimates a position and posture of a moving object 1 further based on first measurement points constituting a newest first measurement point group and second measurement points located within a second threshold distance among second measurement points constituting a second measurement point group acquired by the second acquisition unit 17

Figure 11:
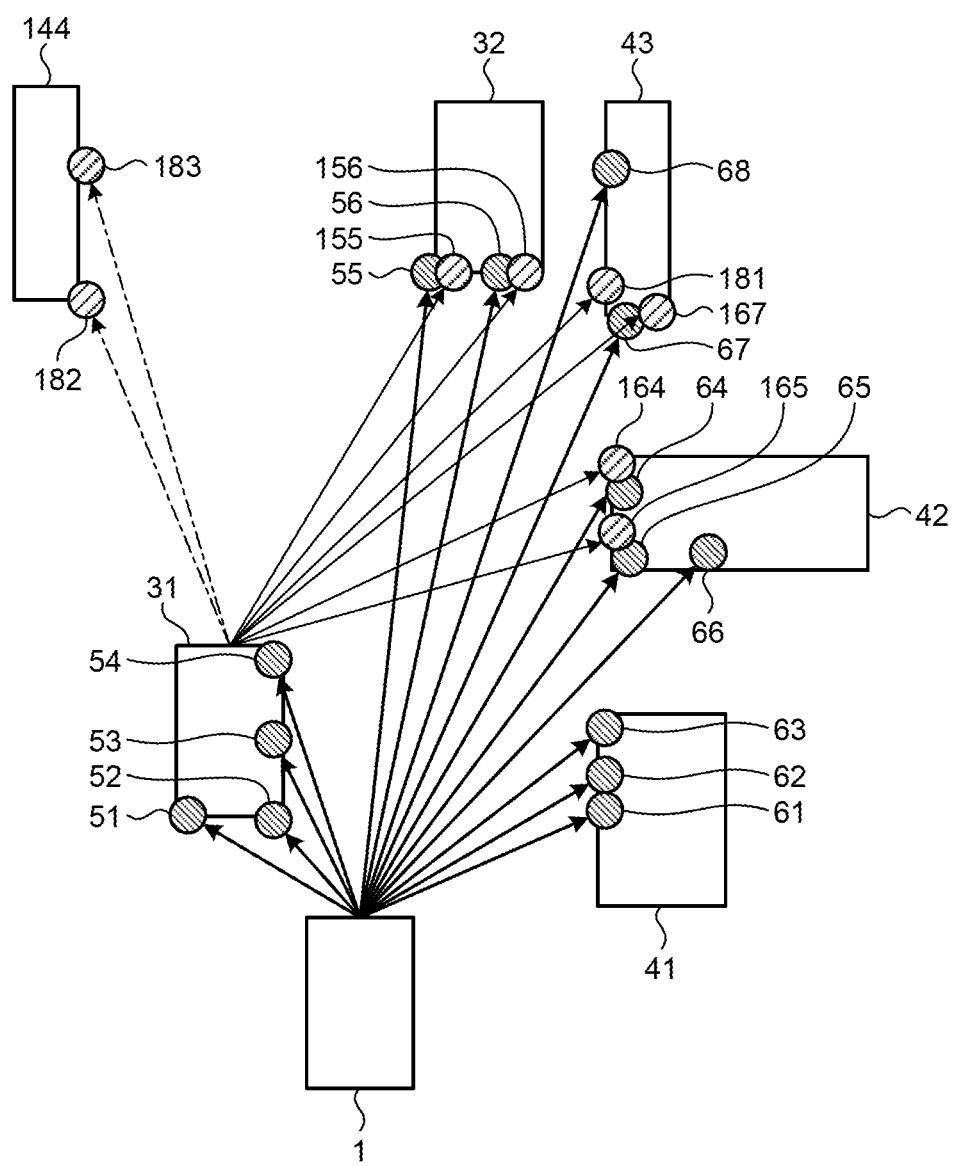
FIG. 11 is a diagram illustrating an example of a first measurement point group and a second measurement point group according to Modified Example 1.

In the example illustrated in FIG. 11, other moving objects 31 and 32 as dynamic obstacles and structures 41, 42, 43, and 144 as static obstacles exist in the periphery of the moving object 1. As the first measurement point group, measurement points 51 to 56 and measurement points 61 to 68 are obtained; and as the second measurement point group obtained from the other moving object 31, measurement points 155, 156, 164, 165, 167, and 181 to 183 are obtained.

In a case where the second measurement points acquired by the second acquisition unit 17 are in the coordinate system of the other moving object defined on the other moving object, the first estimation unit 13 may project the second measurement points on the coordinate system of the own moving object using the position and posture of the other moving object and the position and posture of the own moving object. In a case where the second measurement points acquired by the second acquisition unit 17 are in a world coordinate system, the first estimation unit 13 may project the second measurement points on the coordinate system of the own moving object using the position and posture of the own moving object.

Herein, the measurement points 155, 156, 164, 165, and 167 are assumed to correspond to the measurement points 55, 56, 64, 65, and 67, respectively. With respect to the measurement points 155, 156, 164, 165, and 167, it is assumed that the distances to the corresponding measurement points 55, 56, 64, 65, and 67 are within the second threshold distance. In addition, with respect to the measurement points 181 to 183, it is assumed that there is no corresponding measurement point and the distances to the corresponding measurement points are not within the second threshold distance.

In this case, the first estimation unit 13 estimates the position and posture of the moving object 1 by using the measurement points 155, 156, 164, 165, and 167 as well as the measurement points 51 to 56 and the measurement points 61 to 68 constituting the first measurement point group.

In addition, the classification unit 15 classifies the plurality of first measurement points and a plurality of second measurement points located within the second threshold distance to the first measurement points as a plurality of candidate points. Namely, the classification unit 15 classifies the second measurement points used for the position and posture of the own moving object as well as the plurality of first measurement points as candidate points or static points by using the method described in the above embodiment.

Modified Example 2

In the above-described embodiment, the evaluation value may be obtained by using a second likelihood in addition to the first likelihood.

Figure 12:
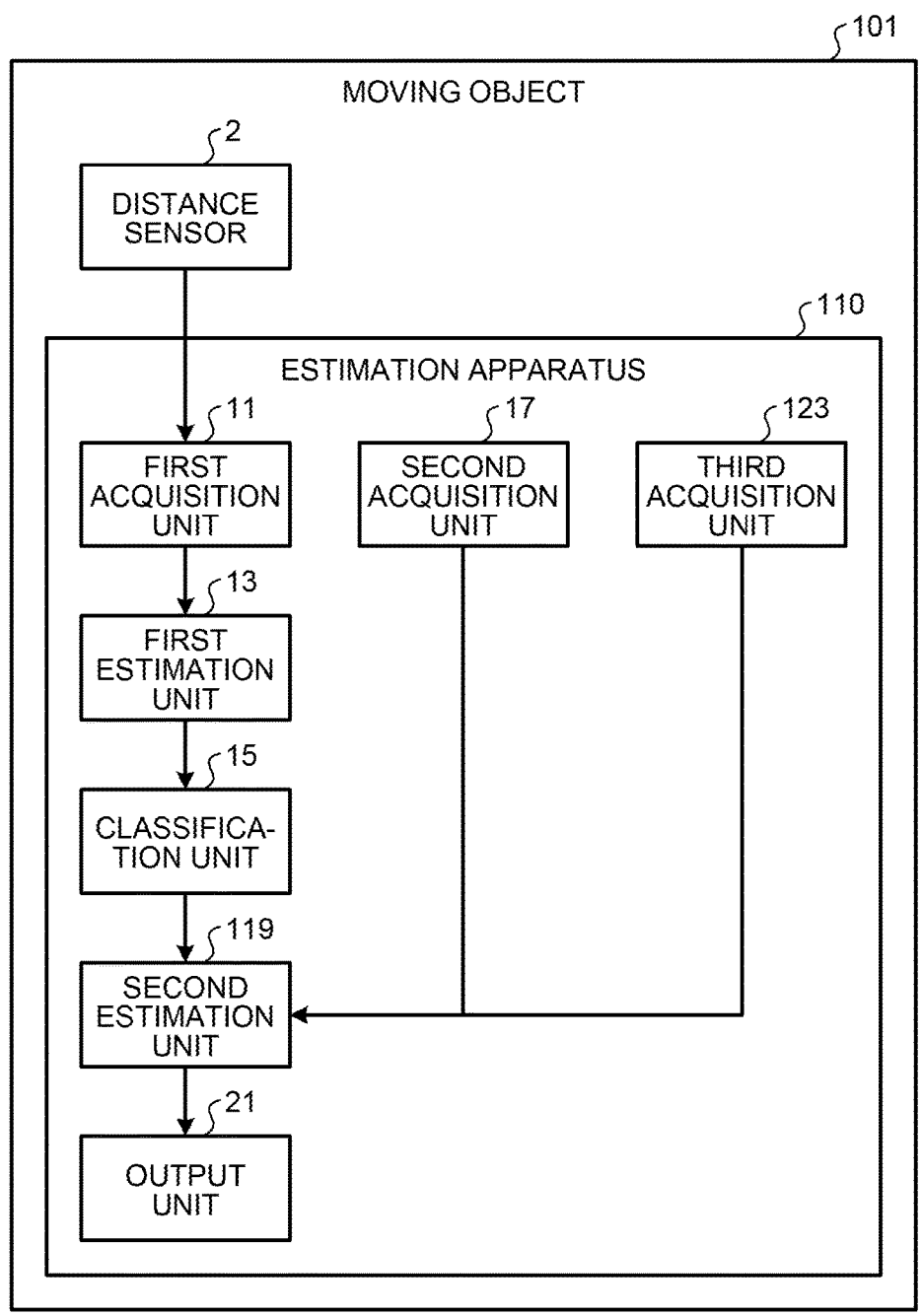
FIG. 12 is a diagram illustrating an example of a configuration of an estimation apparatus according to Modified Example 2.

FIG. 12 is a diagram illustrating an example of a configuration of an estimation apparatus 110 according to according to Modified Example 2. As illustrated in FIG. 12, the estimation apparatus 110 is different from that of the above-described embodiment in terms of a second estimation unit 119 and a third acquisition unit 123.

The third acquisition unit 123 further acquires an image obtained by capturing a periphery of a moving object 101 (first moving object).

The second estimation unit 119 extracts an image region where the other moving object is located from the image acquired by the third acquisition unit 123; projects a plurality of candidate points on the image; further calculates a second likelihood defined by the number of candidate points included in the image region; and calculates an evaluation value by using the first likelihood and the second likelihood. The value of the second likelihood is increased as the number of candidate points included in the image region is increased.

Figure 13:
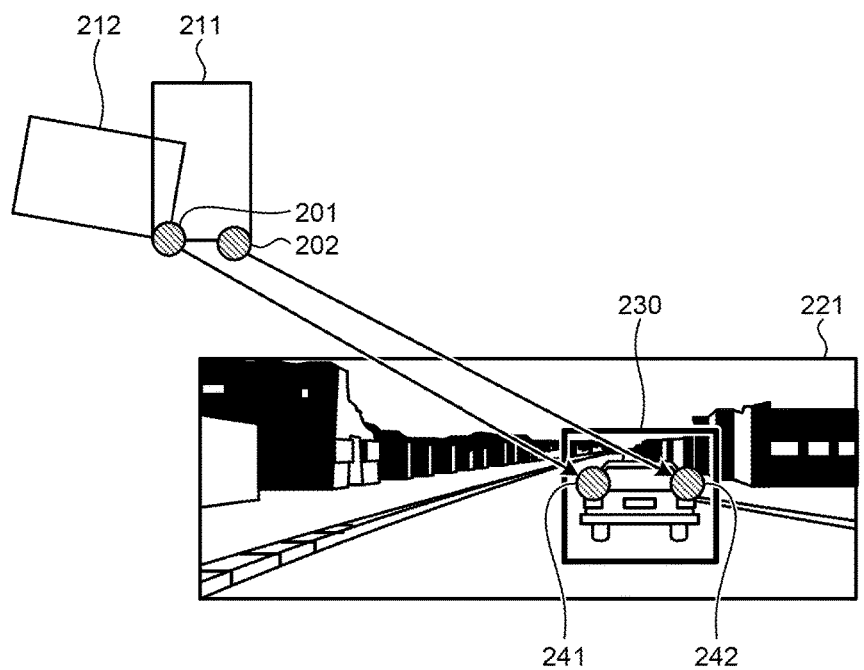
FIG. 13 is a diagram illustrating an example of calculation of second likelihood according to Modified Example 2.

For example, as illustrated in FIG. 13, the second estimation unit 119 extracts an image region 230 where the other moving object is located from an image 221 acquired by the third acquisition unit 123 and projects each of measurement points 201 and 202 classified as the candidate points by the classification unit 15 on the image 221 as projection points 241 and 242. Next, the second estimation unit 119 further calculates the second likelihood from the number of candidate points (more specifically, projection points) included in the image region 230. In addition, the method of calculation of the first likelihood is the same as that of the first embodiment, and as the method of obtaining the evaluation value where the first likelihood and the second likelihood are integrated, the method of the first embodiment may be used.

Hardware Configuration

Figure 14:
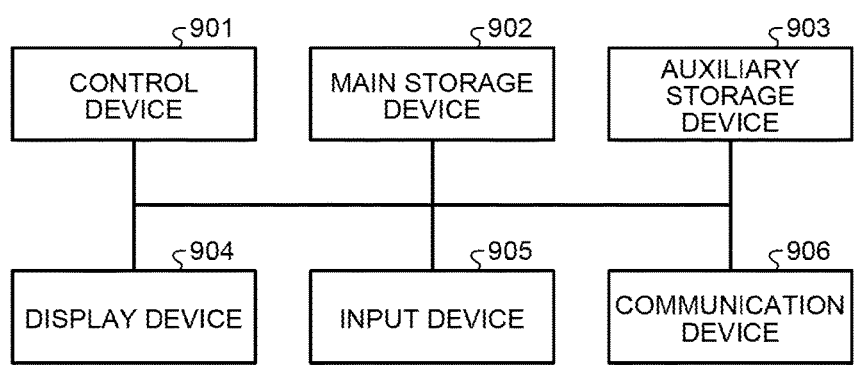
FIG. 14 is a diagram illustrating an example of a hardware configuration of an estimation apparatus according to the embodiment and each Modified Example.

FIG. 14 is a diagram illustrating an example of a hardware configuration of an estimation apparatus according to the embodiment and Modified Examples. As illustrated in FIG. 14, the estimation apparatus according to the embodiment and Modified Examples is configured to include a control device 901 such as a CPU, a main storage device 902 such as a ROM or a RAM, an auxiliary storage device 903 such as an HDD or an SSD, a display device 904 such as a display, an input device 905 such as a keyboard or a mouse, and a communication device 906 such as a communication interface to have a hardware configuration using a typical computer.

A program executed by the estimation apparatus according to the embodiment and Modified Examples may be provided as a file in an installable format or an executable format which is stored in a computer-readable recording medium such as a CD-ROM, a CD-R, a memory card, a DVD (Digital Versatile Disk), and a flexible disk (FD).

In addition, the program executed by the estimation apparatus according to the embodiment and Modified Examples may be stored on a computer connected to a network such as the Internet and may be downloaded via the network to be provided. In addition, the program executed by the estimation apparatus according to the embodiment and Modified Examples may be provided or distributed via the network such as the Internet. In addition, the program executed by the estimation apparatus according to the embodiment and Modified Examples may be incorporated into the ROM or the like in advance.

The program executed by the estimation apparatus according to the embodiment and Modified Examples has a module configuration for implementing the above-described components on the computer. As actual hardware, a CPU reads the program from a ROM or an HDD onto a RAM and executes the program, so that the above-described components are implemented on the computer.

The embodiments are not limited to the embodiment and Modified Examples, but in embodying stage, components of the configuration may be modified and specified within the scope without departing from the spirit of the embodiments. In addition, various embodiments may be formed by appropriately combining a plurality of components of configuration disclosed in the embodiment and Modified Examples. For example, some components may be removed from the entire components of configuration illustrated in the embodiment and Modified Examples. In addition, components of configuration according to another embodiment and Modified Example may be appropriately combined.

For example, with respect to the steps in the flowchart according to the embodiment, as long as the steps are not consistent with properties thereof, the order of execution may be changed, a plurality of steps may be simultaneously performed, or the steps may be performed with different orders for every embodying.

As described heretofore, according to the embodiment and Modified Example, it is possible to improve accuracy of estimation of a position and posture of the second moving object existing in a periphery of a first moving object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation apparatus comprising:
a memory; and
a processor coupled to the memory, wherein the processor is configured to:
acquire repeatedly a first measurement point group including first measurement points obtained by measuring a periphery of a first moving object;
estimate a position and posture of the first moving object;
classify, based at least on the position and posture and a past first measurement point group acquired before a newest first measurement point group, the first measurement points on a second moving object other than the first moving object in the newest first measurement point group as candidate points, and classify the first measurement points other than the candidate points in the newest first measurement point group as static points;
acquire second moving object information including a position of the second moving object and at least one of width and length of the second moving object from the second moving object;
calculate an evaluation value using a first likelihood defined according to a positional relationship between an orientation of a region specified from the second moving object information and the candidate points; and
estimate a position and posture of the second moving object based at least on the evaluation value.

2. The apparatus according to claim 1, wherein the region in an orientation where the evaluation value is highest is estimated as the position and posture of the second moving object.

3. The apparatus according to claim 1, wherein the first likelihood is a likelihood whose value is increased as the number of candidate points included within a first threshold distance from a contour of the region is increased.

4. The apparatus according to claim 1, wherein the first likelihood is a likelihood whose value is increased as the number of static points located between the first moving object and the region is decreased.

5. The apparatus according to claim 1, wherein
the second moving object is located within a predetermined range from the first moving object, and
the predetermined range is widened as a braking distance of the first moving object is increased.

6. The apparatus according to claim 1, wherein
the processor is further configured to acquire, from a third moving object, a second measurement point group obtained by measuring a periphery of the third moving object,
the position and posture of the first moving object are estimated based on the first measurement points constituting the newest first measurement point group and second measurement points located within a second threshold distance among the second measurement points constituting the second measurement point group, and
the processor is configured to classify, as the candidate points, the first measurement points and second measurement points located within the second threshold distance to the first measurement points.

7. The apparatus according to claim 1, wherein
the processor is further configured to:
acquire an image obtained by capturing the periphery of the first moving object,
extract an image region where the second moving object is located from the image,
project the candidate points on the image, and
calculate a second likelihood defined according to the number of candidate points included in the image region, and
the processor is configured to calculate the evaluation value using the first likelihood and the second likelihood.

8. An estimation method comprising:
acquiring repeatedly a first measurement point group including first measurement points obtained by measuring a periphery of a first moving object;
estimating a position and posture of the first moving object;
classifying, based on the position and posture and a past first measurement point group acquired before a newest first measurement point group, the first measurement points on a second moving object other than the first moving object in the newest first measurement point group as candidate points, and classifying the first measurement points other than the candidate points in the newest first measurement point group as static points;
acquiring second moving object information including a position of the second moving object and at least one of width and length of the second moving object from the second moving object;
calculating an evaluation value using a first likelihood defined according to a positional relationship between an orientation of a region specified from the second moving object information and the candidate points; and
estimating a position and posture of the second moving object based on the evaluation value.

9. The estimation method according to claim 8, wherein the region in an orientation where the evaluation value is highest is estimated as the position and posture of the second moving object.

10. The estimation method according to claim 8, wherein the first likelihood is a likelihood whose value is increased as the number of candidate points included within a first threshold distance from a contour of the region is increased.

11. The estimation method according to claim 8 wherein the first likelihood is a likelihood whose value is increased as the number of static points located between the first moving object and the region is decreased.

12. The estimation method according to claim 8, wherein
the second moving object is located within a predetermined range from the first moving object, and
the predetermined range is widened as a braking distance of the first moving object is increased.

13. The estimation method according to claim 8, further comprising:
   acquiring, from a third moving object, a second measurement point group obtained by measuring a periphery of the third moving object, wherein
   the position and posture of the first moving object are estimated based on the first measurement points constituting the newest first measurement point group and second measurement points located within a second threshold distance among the second measurement points constituting the second measurement point group, and
   the classifying includes classifying, as the candidate points, the first measurement points and second measurement points located within the second threshold distance to the first measurement points.

14. The estimation method according to claim 8, further comprising:
   acquiring an image obtained by capturing the periphery of the first moving object,
   extracting an image region where the second moving object is located from the image,
   projecting the candidate points on the image,
   calculating a second likelihood defined according to the number of candidate points included in the image region, and
   calculating the evaluation value using the first likelihood and the second likelihood.

15. A computer program product comprising a non-transitory computer-readable medium including programmed instructions, the instructions causing a computer to execute:
   acquiring repeatedly a first measurement point group including first measurement points obtained by measuring a periphery of a first moving object;
   estimating a position and posture of the first moving object;
   classifying, based on the position and posture and a past first measurement point group acquired before a newest first measurement point group, the first measurement points on a second moving object other than the first moving object in the newest first measurement point group as candidate points, and classifying the first measurement points other than the candidate points in the newest first measurement point group as static points;
   acquiring second moving object information including a position of the second moving object and at least one of width and length of the second moving object from the second moving object; and
   calculating an evaluation value using a first likelihood defined according to a positional relationship between an orientation of a region specified from the second moving object information and the candidate points and estimating a position and posture of the second moving object based on the evaluation value.

\* \* \* \* \*